United States Patent

Kuo et al.

[15] 3,636,762
[45] Jan. 25, 1972

[54] RESERVOIR TEST

[72] Inventors: Chiang-Hai Kuo, Houston, Tex.; Ronald P. Nordgren, The Hague, Netherlands; John P. Vogiatzis, Houston, Tex.

[73] Assignee: Shell Oil Company, New York, N.Y.

[22] Filed: May 21, 1970

[21] Appl. No.: 39,341

[52] U.S. Cl..............................................................73/155
[51] Int. Cl........................................................E21b 47/10
[58] Field of Search..............................73/155, 38; 166/250

[56] References Cited

UNITED STATES PATENTS 2,409,674  10/1946  Graybeal..............................73/38 UX Primary Examiner—Jerry W. Myracle
Attorney—J. H. McCarthy and Theodore E. Bieber

[57] ABSTRACT

A method for measuring reservoir properties including skin factor and permeability thickness product of a porous earth formation with respect to injected fluid around a fluid injection well by rapidly increasing the rate of fluid injection to a new higher rate, maintaining injection substantially constant at this higher rate, and recording the variation with time of the fluid injection pressure as the injection rate is held substantially constant.

6 Claims, 2 Drawing Figures

INVENTORS:
C.H. KUO
R.P. NORDGREN
J.P. VOGIATZIS 3,636,762

RESERVOIR TEST

BACKGROUND OF THE INVENTION

This invention relates to well testing, and more particularly, to a method for measuring reservoir properties of a porous earth formation traversed by a fluid injection well.

DESCRIPTION OF THE PRIOR ART

Transient pressure tests of various types have been used for many years in the testing of oil, gas, and water wells, to determine reservoir properties. A common example is the pressure buildup test, obtained by shutting in a well which has been producing at a constant rate for an extended period of time. The bottom hole pressure is measured prior to shut-in, and the subsequent pressure buildup during a selected period of time after closing the well is recorded as a function of the shut-in time. Similar methods have been used to determine reservoir properties around fluid injection wells; these usually involve shutting down the injection well and measuring the fall off of the injection pressure as a function of time.

A major disadvantage of the aforementioned techniques is that in order to calculate both the permeability thickness product of the reservoir and any damage or improvement to the fluid flow characteristics of the formation near the well bore (often call "skin factor"), the well must be shut in until the pressure varies linearly with respect to a logarithmic function of time. In the case of an injection well pressure fall off test, this means that a fluid injection program may have to be interrupted for periods as long as several days if the desired formation characteristics are to be obtained from conventional fall off analysis.

SUMMARY OF THE INVENTION

Therefore, it is an object of the present invention to provide a process for determining these formation characteristics without measuring pressure as a function of time during an extended pressure fall off period.

According to the invention, reservoir properties, such as the skin factor and permeability thickness product with respect to injected fluid of a porous earth formation penetrated by a well through which fluid is injected into the formation, are measured by a process which comprises the steps of rapidly increasing the rate of fluid injection from an initial rate to a higher rate, maintaining the fluid injection rate constant at this higher rate, and recording the variation with time of the fluid injection pressure. The method is applicable both to a reservoir system having two moving phases as where injected fluid is displacing a different fluid, (e.g., injected water displacing oil) and to a reservoir system having only one moving fluid phase.

DESCRIPTION OF THE PREFERRED EMBODIMENT

Figure 1:
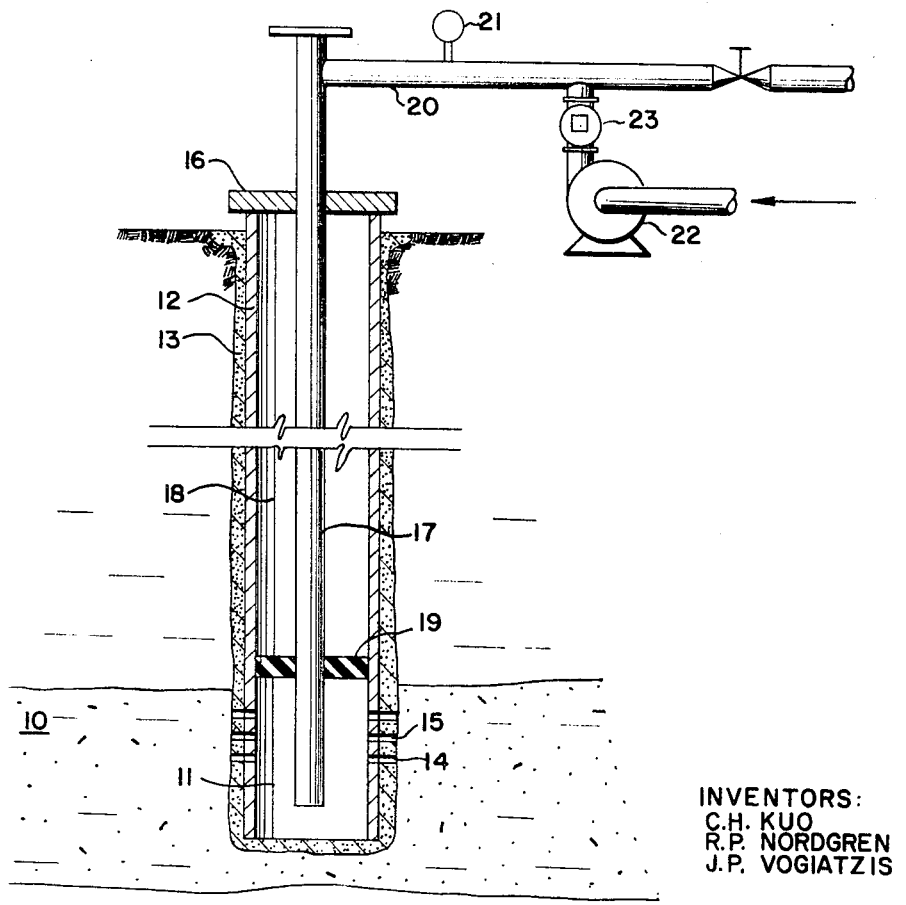
FIG. 1 is a cross-sectional view showing a well suitably equipped for the practice of this invention and surrounding earth formations.

FIG. 1 shows an earth formation 10 penetrated by a well borehole 11 equipped in a manner suitable for the practice of this invention. The borehole 11 is preferably cased with a casing 12 cemented therein with cement 13 by procedures well known in the art. The borehole 11 may be opened into fluid communication with formation 10 by a number of perforations 14 and 15 created by known operations. The top of the casing is closed by an appropriate well head assembly 16. A string of tubing 17 provides a fluid conduit from the surface to near bottom of the borehole 11 or the formation of interest 10. The annular space 18 between tubing 17 and the casing 12 may be sealed off above the formation 10 by means such as a packer 19.

The top of the tubing string 17 is connected in fluid communication with a flow line 20 which may carry a pressure-measuring means, such as a recorder 21 of a conventional type and a flow-metering means 23. The flow line 20 is operatively connected to a pump means 22 which is adapted to pump fluid from a fluid source (not shown) through flow line 20 and tubing 17 into the formation 10.

To determine reservoir properties of the formation 10 according to the method of this invention, an injection fluid such as water may be injected through the tubing 20 into the formation 10 at a rapidly increased rate by appropriately adjusting pump means 22. After a desired rate has been attained, injection is continued at that rate. Simultaneously with achievement of the new higher injection rate, the fluid injection pressure is recorded on pressure recorder 21 as it varies with time.

Where the injected fluid has a mobility different from the mobility of the fluid displaced by the injected fluid, it is preferred, for ease of analysis, that the initial injection pressure be substantially equivalent to the average pressure in the earth formation 10. Thus, with respect to water injection wells in oil field secondary recovery projects, the invention is preferably practiced after the well has been closed in for a time sufficient for the bottom hole pressure in the well to approximate the average reservoir pressure. For example, convenient time for the practice of the invention may be when a producing well is first converted to injection or after a period in which injection was stopped due to mechanical failure.

The magnitude of the increase in injection rate may range from 1 barrel per hour up to 100 barrels per hour, or more, depending primarily upon the injectivity of the well to be tested. The main criteria is that the increase of rate be large enough to create a measurable pressure response without raising the bottom hole pressure high enough to fracture the formation 10.

Injection of fluid into the well and thence into the formation of interest is preferably maintained substantially constant at the new higher injection rate until the rate of pressure increase is constant with respect to a logarithmic function of time. That is, the higher rate is preferably maintained at least until a plot of the pressure read from gauge 21 versus the logarithm of time becomes linear. The time necessary to achieve such a linear relationship may vary from an hour or less to a day or more depending upon the reservoir properties. After the linear relationship is achieved, the injection rate may be varied in any desired manner without effect upon the process of this invention.

Analysis of the data obtained from the above process is based upon a solution of those equations which describe the flow of fluid in a porous medium.

For example, for radial flow away from an injection well, fluid flow may be described by the following equation:

$$(1) \quad \frac{1}{r}\frac{\delta}{\delta r}\left[r\frac{\delta P}{\delta r}\right] = \frac{k}{\phi \mu c}\frac{\delta P}{\delta t}$$

where
$r$ = radial distance from injection well
$p$ = pressure
$t$ = time
$\phi$ = porosity
$k$ = permeability
$\mu$ = fluid viscosity
$c$ = compressibility Assuming that water is being injected into an oil-bearing formation of uniform thickness and that the injected water displaces all except the residual oil so that two banks of fluid exist in the reservoir—a water bank in which only water flows and an oil bank in which only oil flows, equations of the form of (1) above may be solved for the oil bank and the water bank to yield the following expression for the injection pressure change as a function of time in an undamaged well bore of assumed zero radius when injection is rapidly increased to, and maintained substantially constant at, a rate $i_w$.

$$(2) \quad P_i - P_w = -\frac{iw}{4\pi h \lambda_w}\left\{Ei\left(-\frac{X^2_f}{4\eta_w}\right) - Ei\left(-\frac{X_w^2}{4\eta_w}\right)\right.$$
$$\left. - M\exp\left[\frac{X^2_f}{4}\left(\frac{1}{\eta_o}-\frac{1}{\eta_w}\right)\right]Ei\left(-\frac{Xf^2}{4\eta_o}\right)\right\}$$

where,
- $P_w$ = well pressure
- $P_i$ = initial formation pressure
- $i_w$ = water injection rate
- $h$ = formation thickness
- $\lambda_w$ = water mobility, $k_w/\mu_w$
- $\lambda_o$ = oil mobility, $k_o/\mu_o$
- $X_f$ = variable $r/\sqrt{t}$ at the moving oil water interface
- $X_w$ = variable $r/\sqrt{t}$ at the well face = $r_w/\sqrt{t}$
- $\eta_w$ = hydraulic diffusivity in the water bank, $k_w/\phi\mu_w c_w$
- $\eta_o$ = hydraulic diffusivity in the oil bank, $k_o/\phi\mu_o c_o$
- $M$ = mobility ratio, $\lambda_w/\lambda_o$ and $r, t, K, \phi, \mu$ and $c$ are given in equation (1).

If the fluid flow properties of the formation have been damaged or improved near the well bore, there may be an additional pressure change due to these near the well bore effects (called skin effects). This pressure changes is given by the equation:

$$(3) \quad \Delta P_s = -s\, (i_w \mu_w / 2\pi k_w h)$$

where,
- $\Delta P_s$ = pressure change due to skin effect, and
- $s$ = skin factor.

Thus, the observed injection pressure change at the well face may be given by the sum of the pressure change which would be observed in an undamaged well bore and the pressure change due to skin effects. That is $$(4) \quad P_i - P_{wf} = P_i - P_w + \Delta P_s.$$

or, from equations (2) and (3), $$(5) \quad P_i - P_{wf} = -\frac{iw}{4\pi h \lambda_w}\left\{Ei\left(-\frac{X_f^2}{4\eta_w}\right) - Ei\left(-\frac{X^2_w}{4\eta_w}\right)\right.$$
$$\left. + 2s - M\exp\left[\frac{X_f^2}{4}\left(\frac{1}{\eta_o}-\frac{1}{\eta_w}\right)\right]Ei\left(-\frac{X_f^2}{4\eta_o}\right)\right\}$$

The following approximation for $Ei$-function is permissible for $Z<0.01$.

$$(6) \quad -(-Z) = -\gamma - \ln Z$$

where $\gamma = 0.5772$.

Thus, for values of $X_f^2/4\eta_w$ and $X_f^2/4\eta_o$ less than 0.01, the observed pressure change may be given by the equation:

$$(7) \quad P_{wf} - P_i = i_w/4\pi h \lambda w \left\{\ln t + 2s + \ln X_f^2 - 2\, 2\ln r_w - M(\gamma - \ln X_f^2/4\eta_o)\right\}.$$

Material balance calculations show that for small values of $X_f^2/a8j_w$, $X_f^2$ can be approximated by the equation:

$$(8) \quad X_f^2 = \frac{i_w}{\pi h \phi_w \Delta S}\exp\left[-\frac{X_f^2}{4\eta_w}\right] \approx \frac{i_w}{\pi h \phi_w \Delta S}$$

where,
- $\Delta S$ = difference in oil saturation between the oil bank and the water bank.

Therefore, for those cases in which $X_f^2/4\eta_w$ is small, equation (6) can be rewritten in the form $$(9) \quad P_{wf} - P_i = m \ln t + b.$$

where, $$(10) \quad m = i_w/4\pi h \lambda_w = i_w \mu_w / 4\pi h k_w$$

and, $$(11) \quad b = m\left\{2s - 2\ln r_w + (1-M)\ln(i_w/\pi h \phi_w \Delta S)\right.$$
$$\left. - M(\gamma - \ln 4\eta_o)\right\}$$

Thus, the slope, $m$, of a straight line plot of injection pressure change versus the logarithm of time after a rapid increase in injection rate in a water injection well taken together with equation (9) may be used to determine the water-permeability thickness product for a reservoir. The intercept, $b$, (when logarithm of time = 0), of such a plot together with equation (10) may be used to determine the skin factor.

Figure 2:
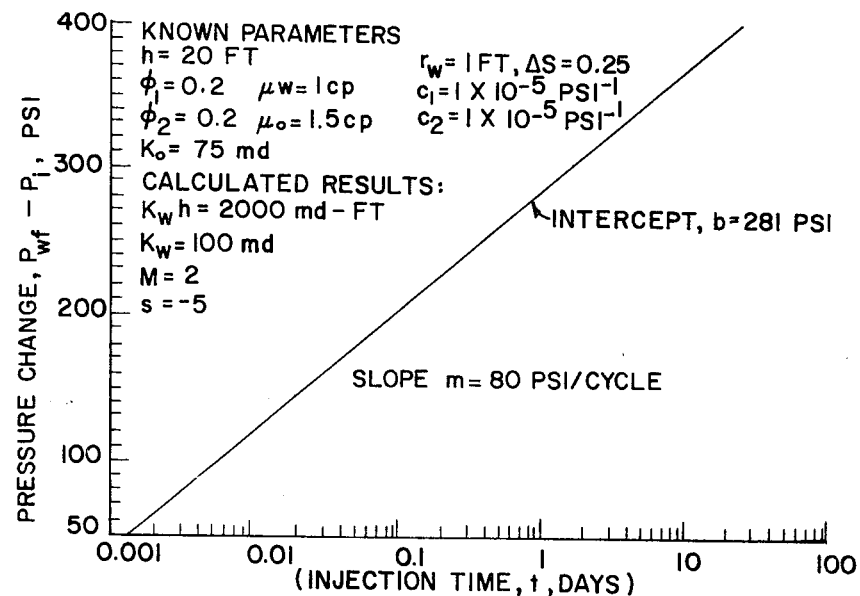
FIG. 2 is a semilogarithmic plot of pressure change versus time of a type that may be profitably used in the analysis of information obtained in the practice of this invention.

FIG. 2 is an example of a type of a plot of pressure increase versus time on semilogarithmic paper which may be profitably used in the analysis of data obtained from the process of this invention when the assumptions made in developing equations (7) and (8) are valid. The graph shows the pressure response in a water well in which the injection rate is rapidly raised from 0 to 1,000 barrels per day and maintained substantially constant at this higher rate. By substituting the observed slope of the graph, 80 p.s.i. per cycle, for $m$ in equation (10) and the intercept, 280 p.s.i., at time equals 1 day (log 1=0) for $b$ in equation (11) and by using the known reservoir parameters given on FIG. 2, it may be determined that the water-permeability thickness product, $k_w h$, of the formation into which fluid is injected is 2,000 md-ft and that the skin factor, $s$, is $-5$.

In summary, our invention is a method for measuring a reservoir property or a combination of properties, such as permeability thickness product with respect to injected fluid or skin factor, of a porous subsurface earth formation penetrated by a well by injecting a fluid such as water into the reservoir through the well at an initial injection rate (which may be zero), rapidly increasing the fluid injection rate from the initial injection rate to a higher test-injection rate, maintaining the fluid injection rate substantially constant at said higher test-injection rate, and, while maintaining the higher test-injection rate, measuring and/or recording the fluid injection pressure as it varies with time. In a preferred embodiment of the invention the injection rate is maintained substantially constant until the pressure changes according to a linear function of the logarithm of time. In one embodiment the well may first be shut-in until the bottom hole pressure in the well is substantially equal to the average reservoir pressure.

We claim as our invention:

1. A method for measuring a reservoir property of a porous earth formation penetrated by a well, the method comprising the steps of:

injecting a fluid into the reservoir through said well at an initial fluid injection rate and under a fluid injection pressure;

rapidly increasing the fluid injection rate from the initial fluid injection rate to a higher test-injection rate;

maintaining the fluid injection rate substantially constant at said higher test-injection rate; and, measuring the fluid injection pressure as it varies with time while continuing to maintain said fluid injection rate substantially constant at said higher test-injection rate at least until pressure changes according to a linear function of the logarithm of time.

2. The method of claim 1 wherein the reservoir property to be measured is the permeability thickness product of the formation with respect to injected fluid.

3. The method of claim 2 including the step of first shutting in the well for a period sufficient to allow the bottom hole pressure in the well to become substantially equal to the average reservoir pressure.

4. The method of claim 1 wherein the reservoir property to be measured is the skin factor.

5. The method of claim 1 wherein the initial fluid injection rate is zero.

6. The method of claim 1 wherein the fluid injected is water.

* * * * *